A. SCHOLIN.
LABEL PASTING MACHINE.
APPLICATION FILED AUG. 11, 1916. RENEWED NOV. 28, 1919.
1,417,634.
Patented May 30, 1922.
11 SHEETS—SHEET 5.
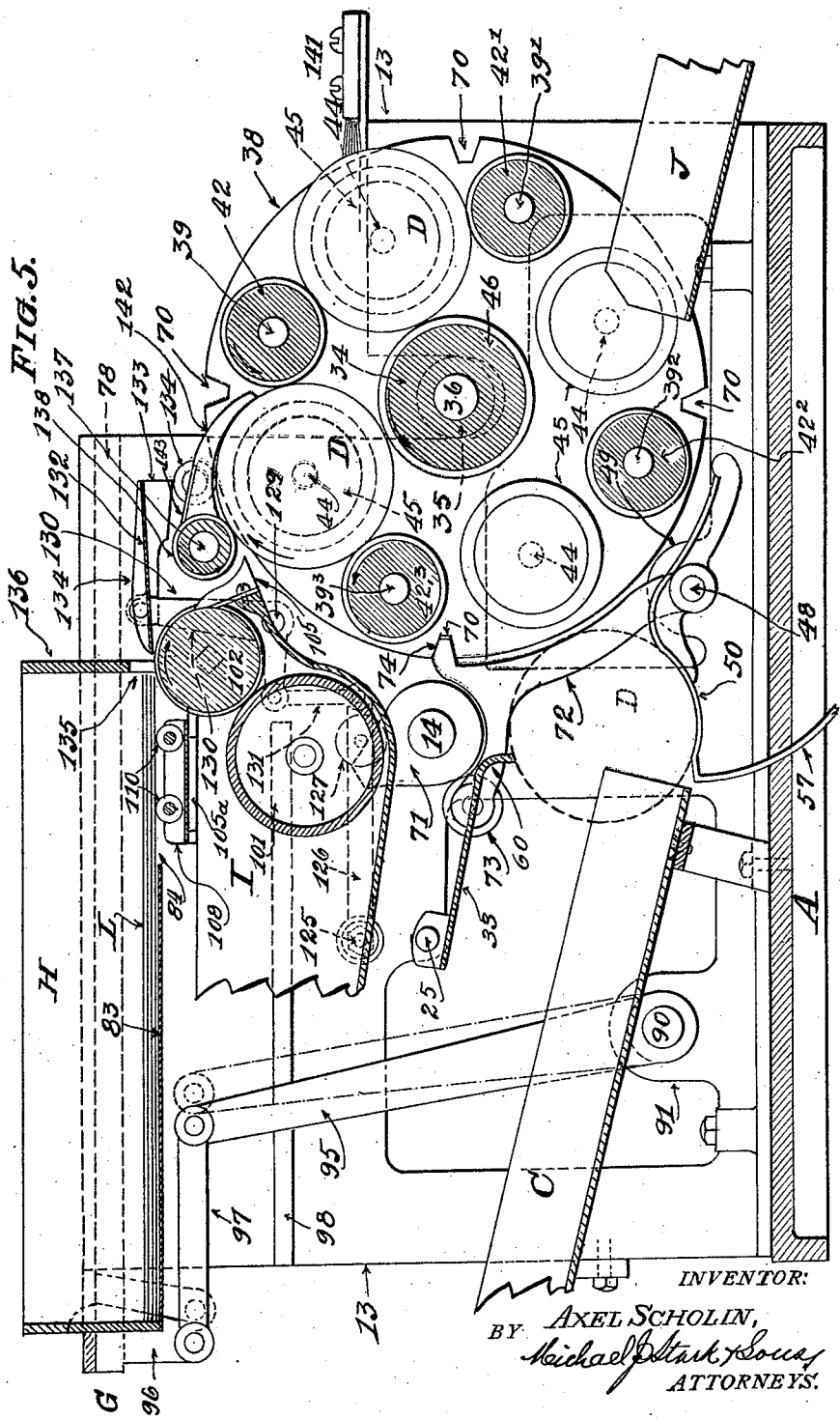
INVENTOR:
AXEL SCHOLIN,
BY Michael J. Stark & Sons
ATTORNEYS.

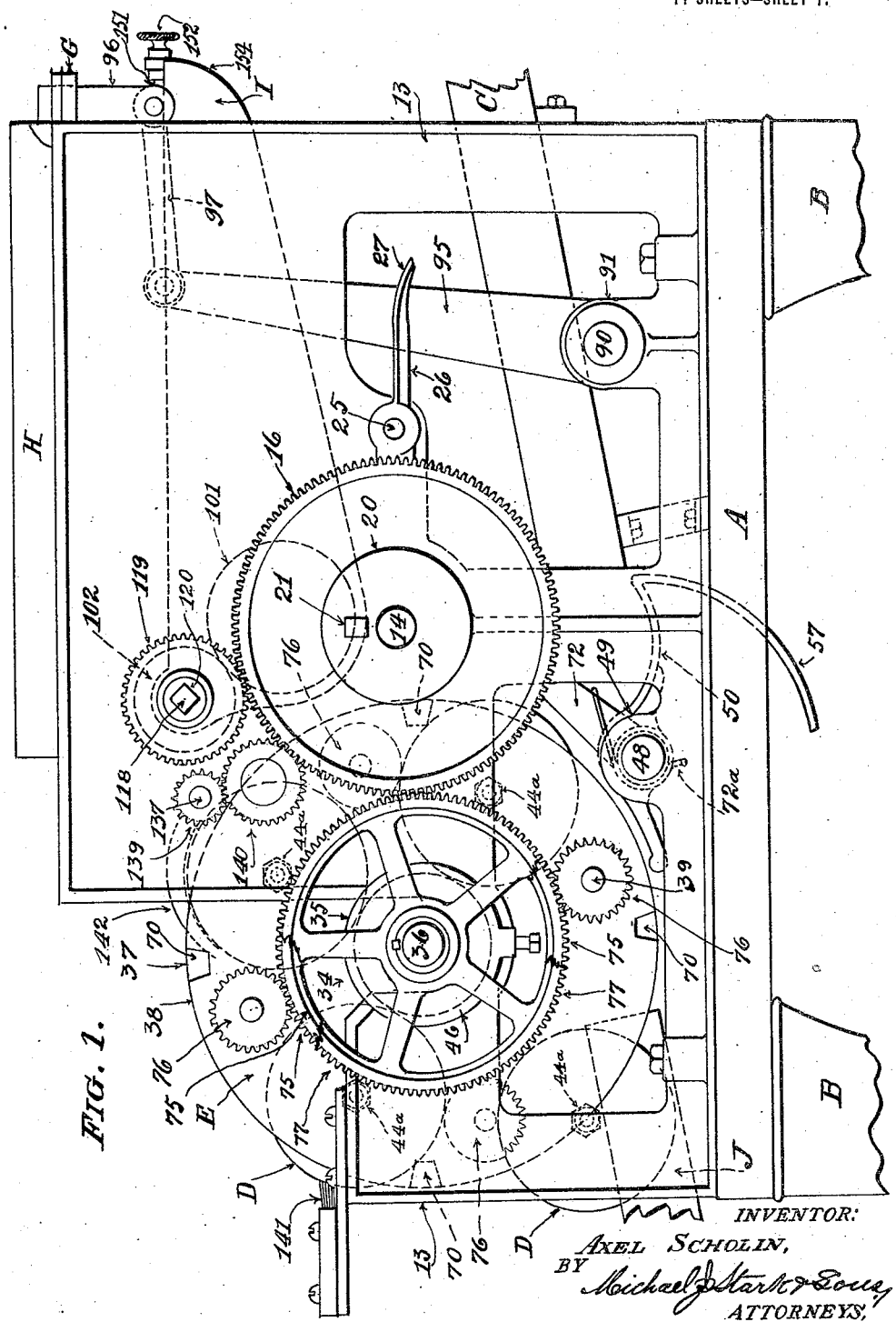

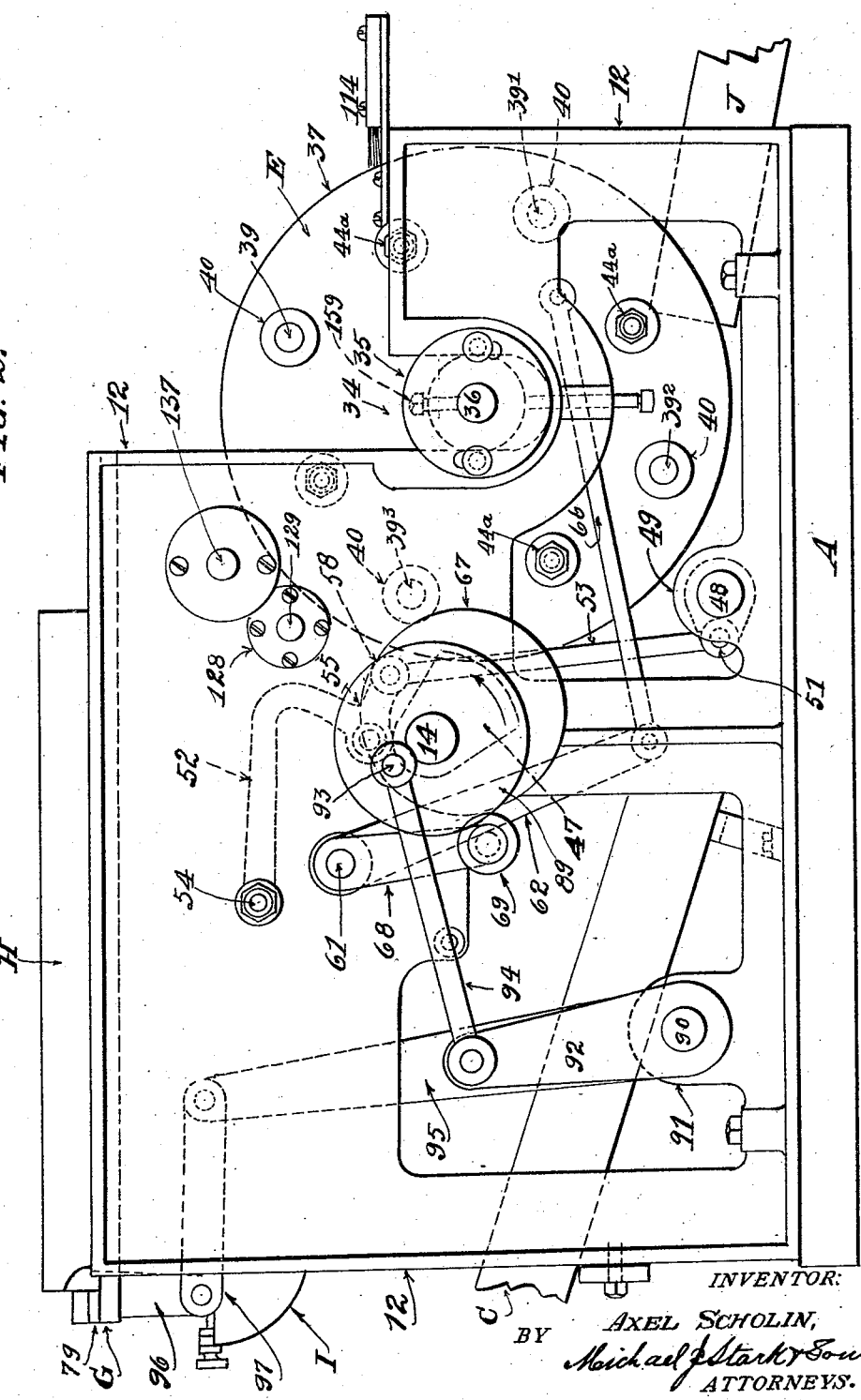

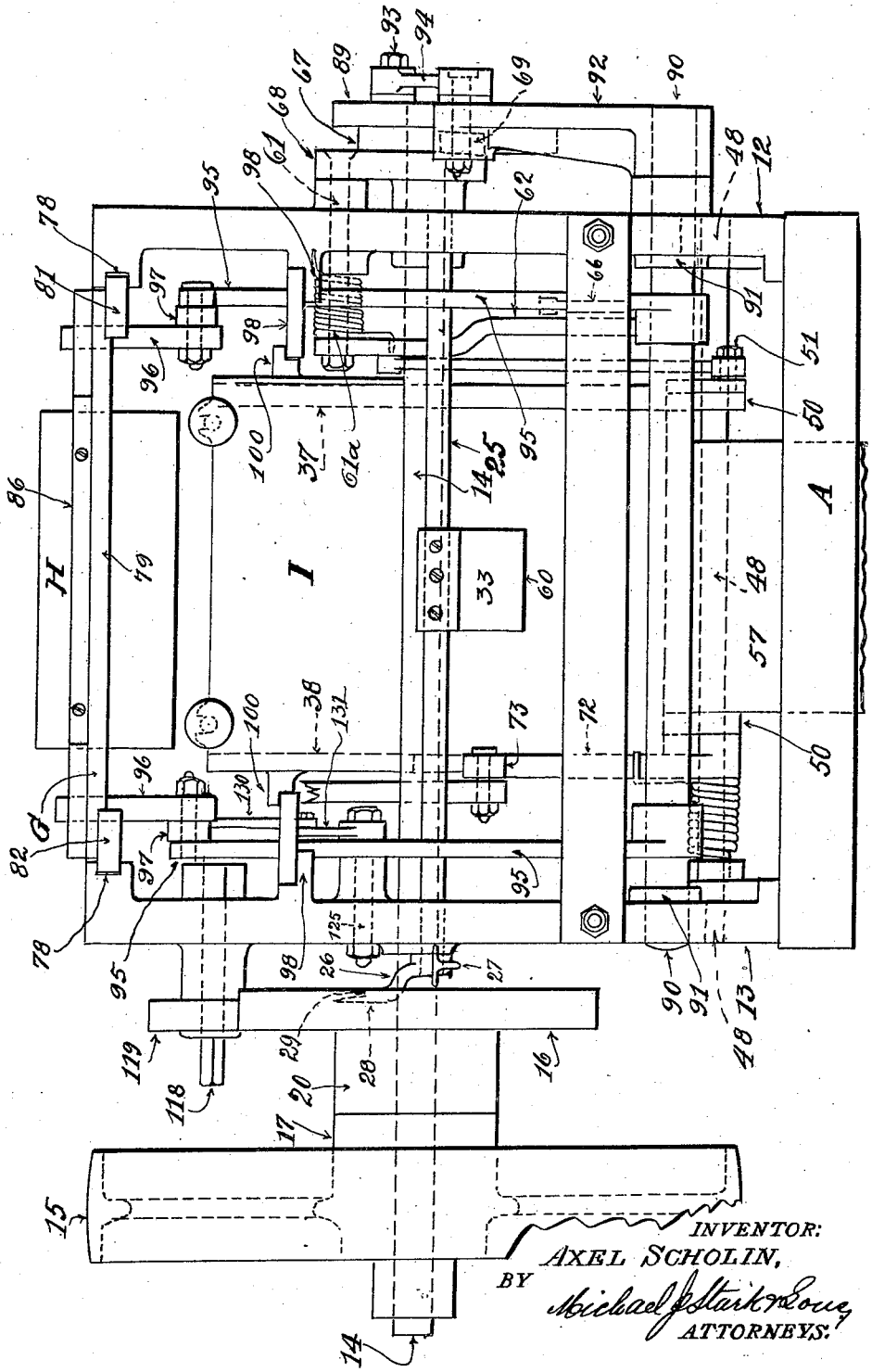

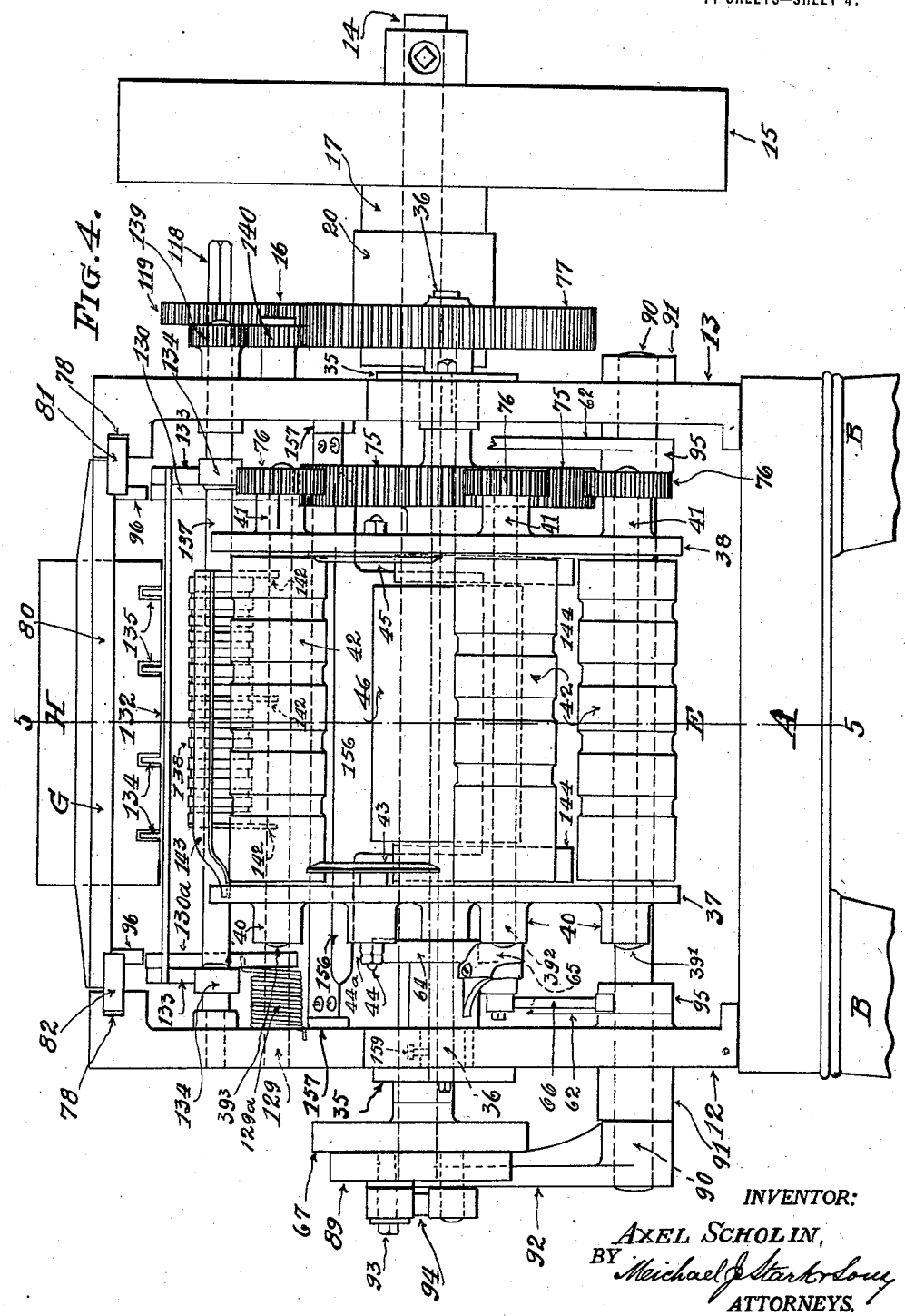

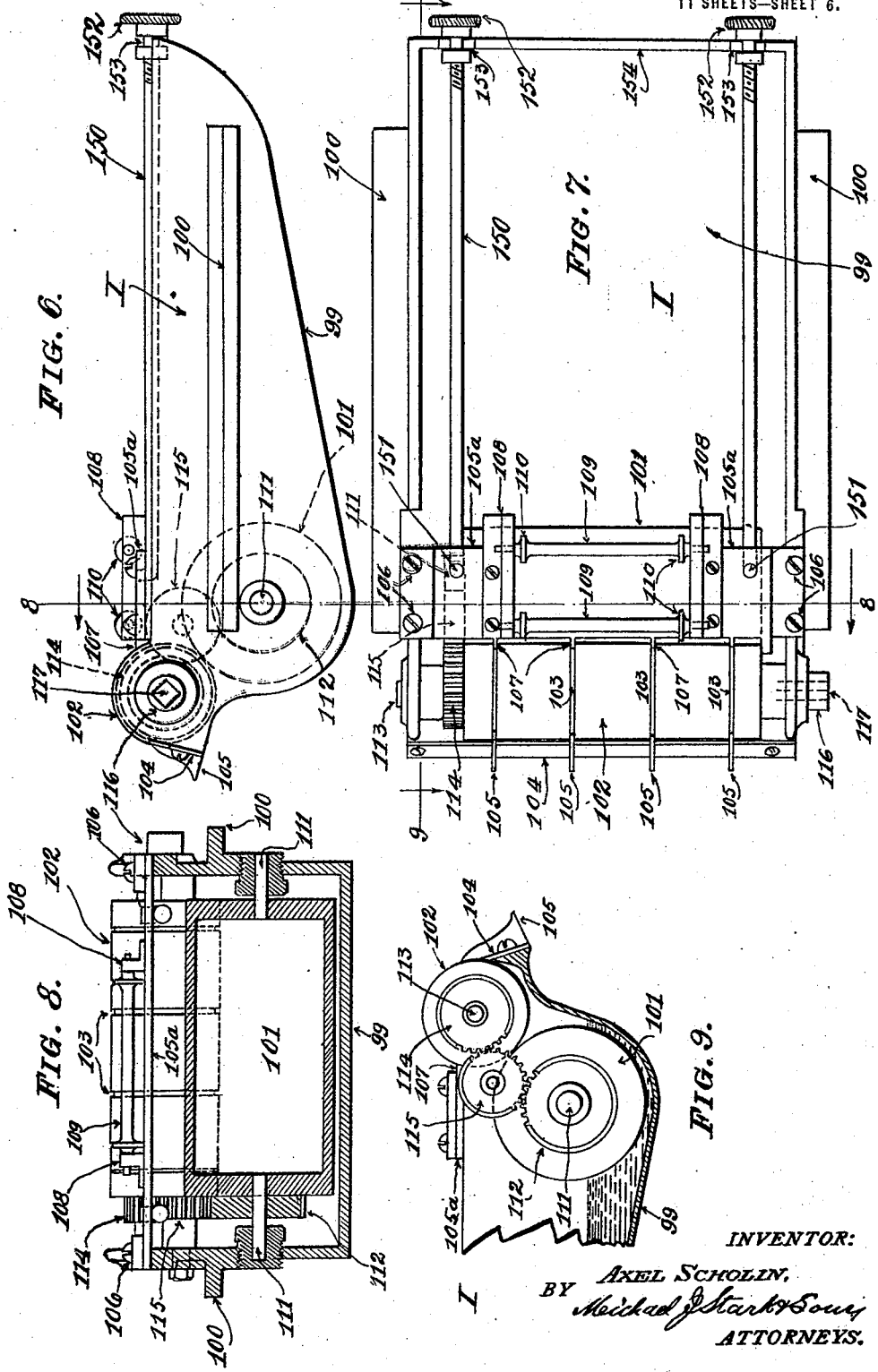

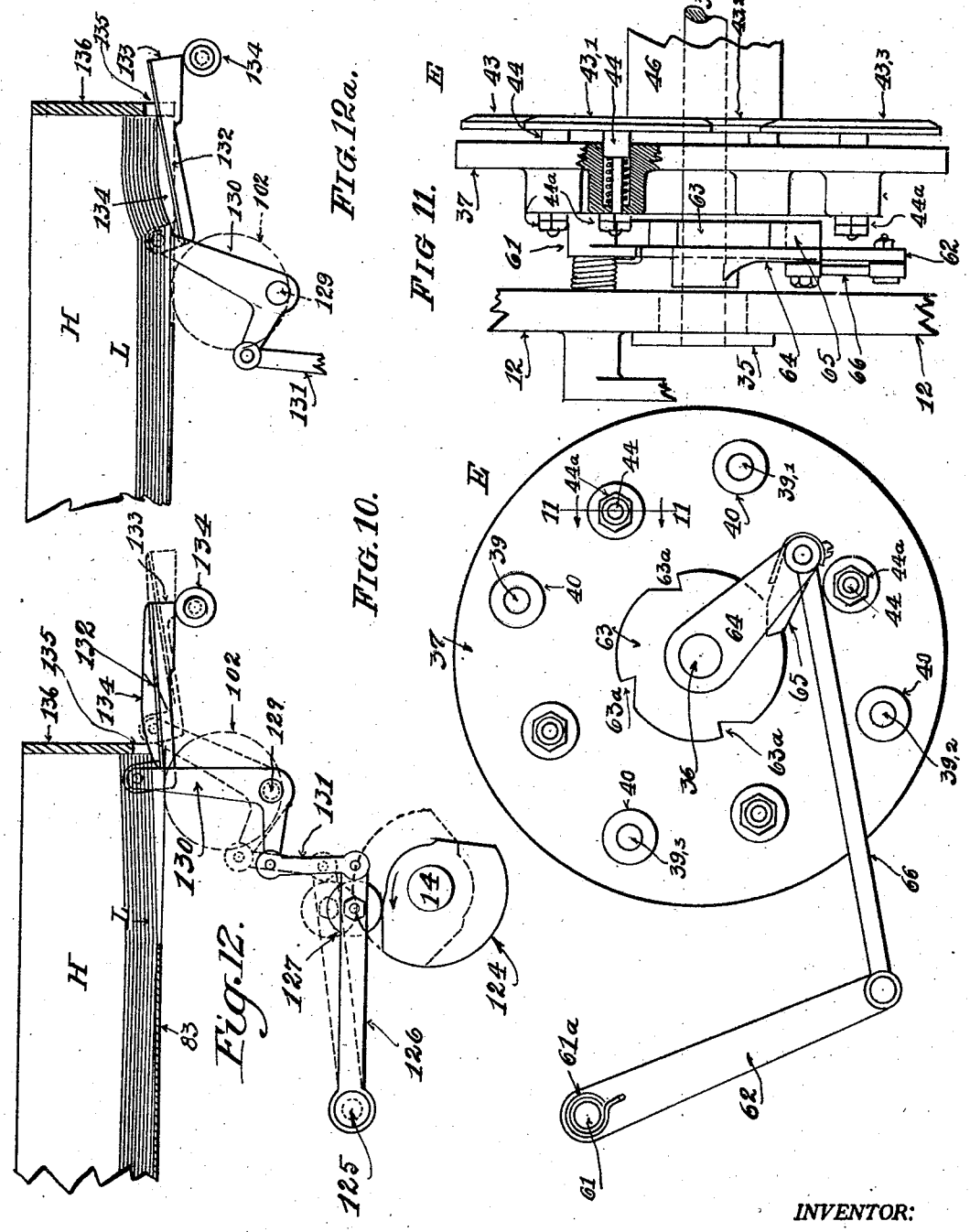

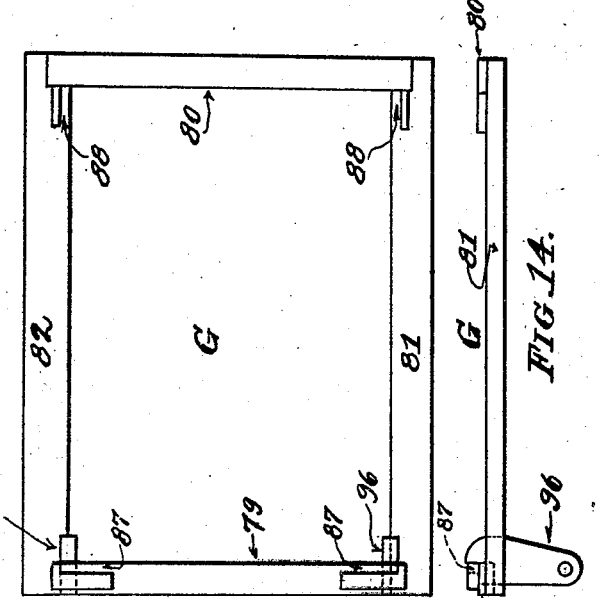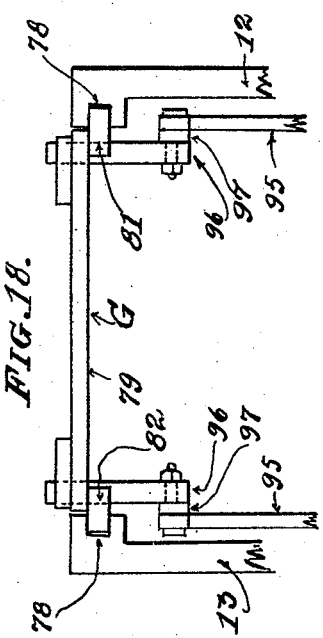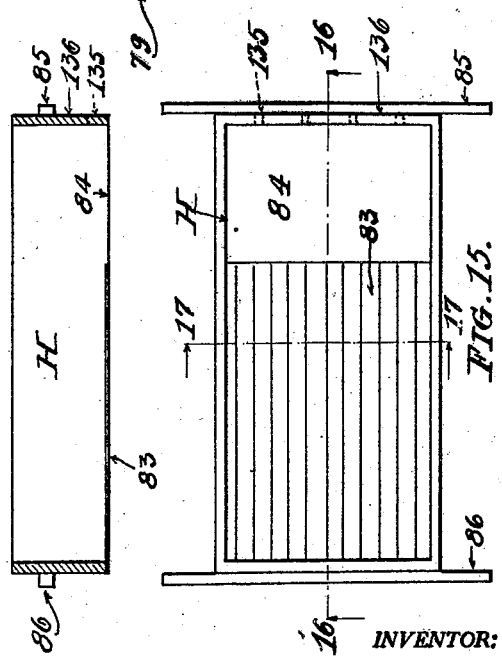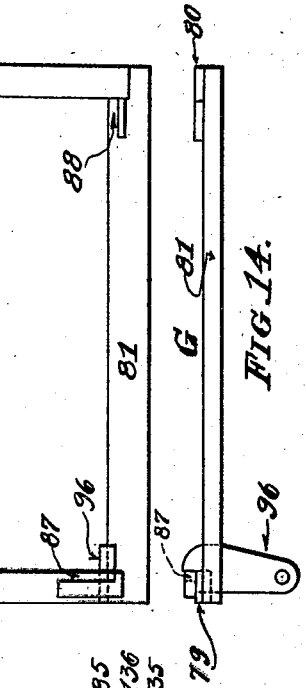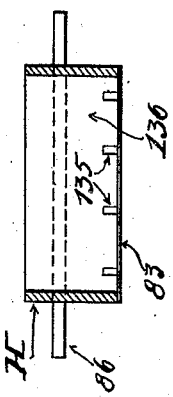

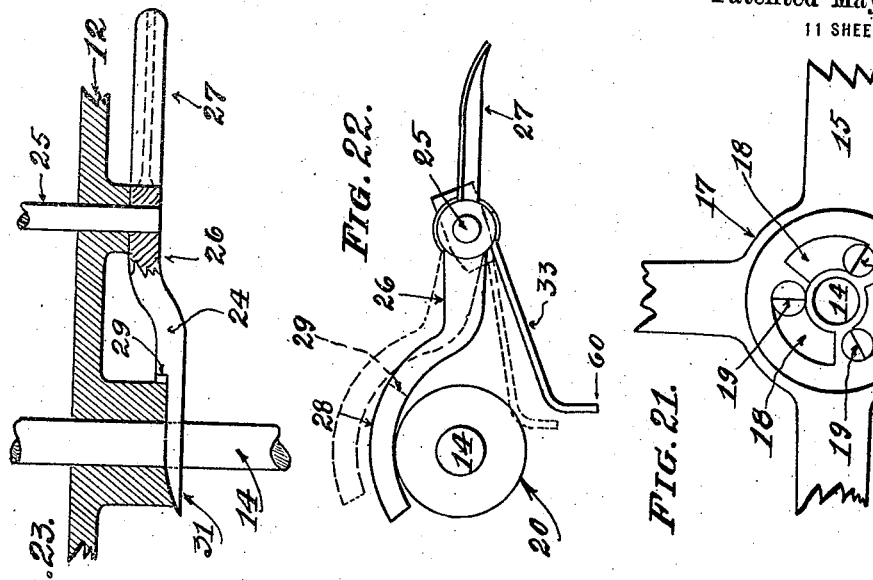

A. SCHOLIN.
LABEL PASTING MACHINE.
APPLICATION FILED AUG. 11, 1916. RENEWED NOV. 28, 1919.
1,417,634.
Patented May 30, 1922.
11 SHEETS—SHEET 10.
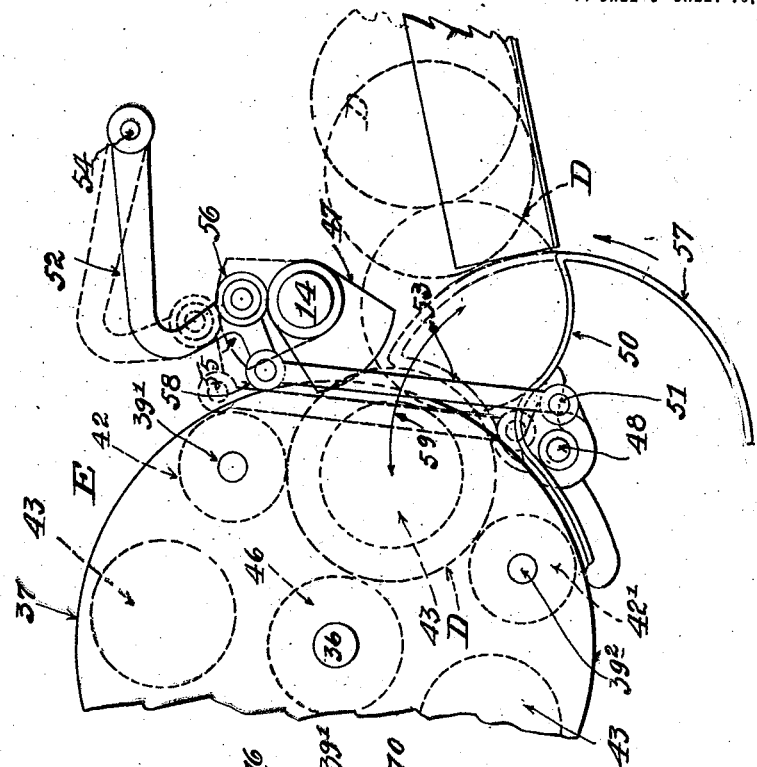
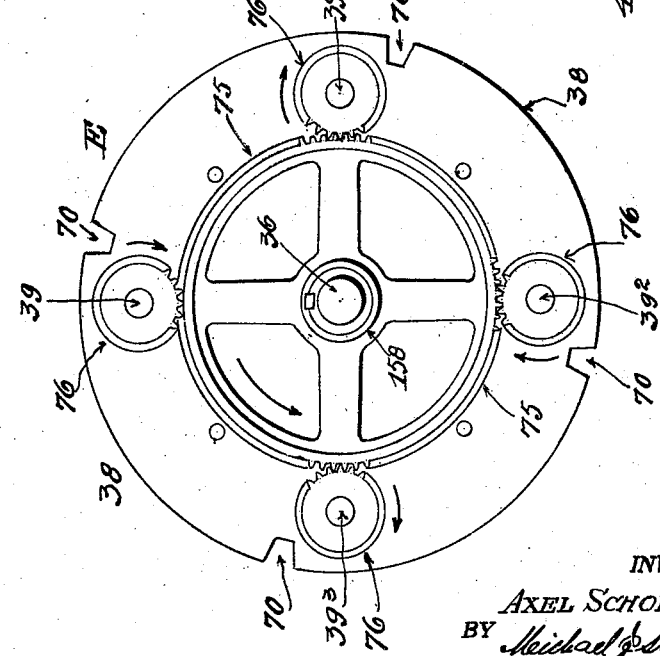
INVENTOR:
AXEL SCHOLIN,
BY *Michael J. Starker Song*
ATTORNEYS.

A. SCHOLIN.
LABEL PASTING MACHINE.
APPLICATION FILED AUG. 11, 1916. RENEWED NOV. 28, 1919.
1,417,634.
Patented May 30, 1922.
11 SHEETS—SHEET 11.
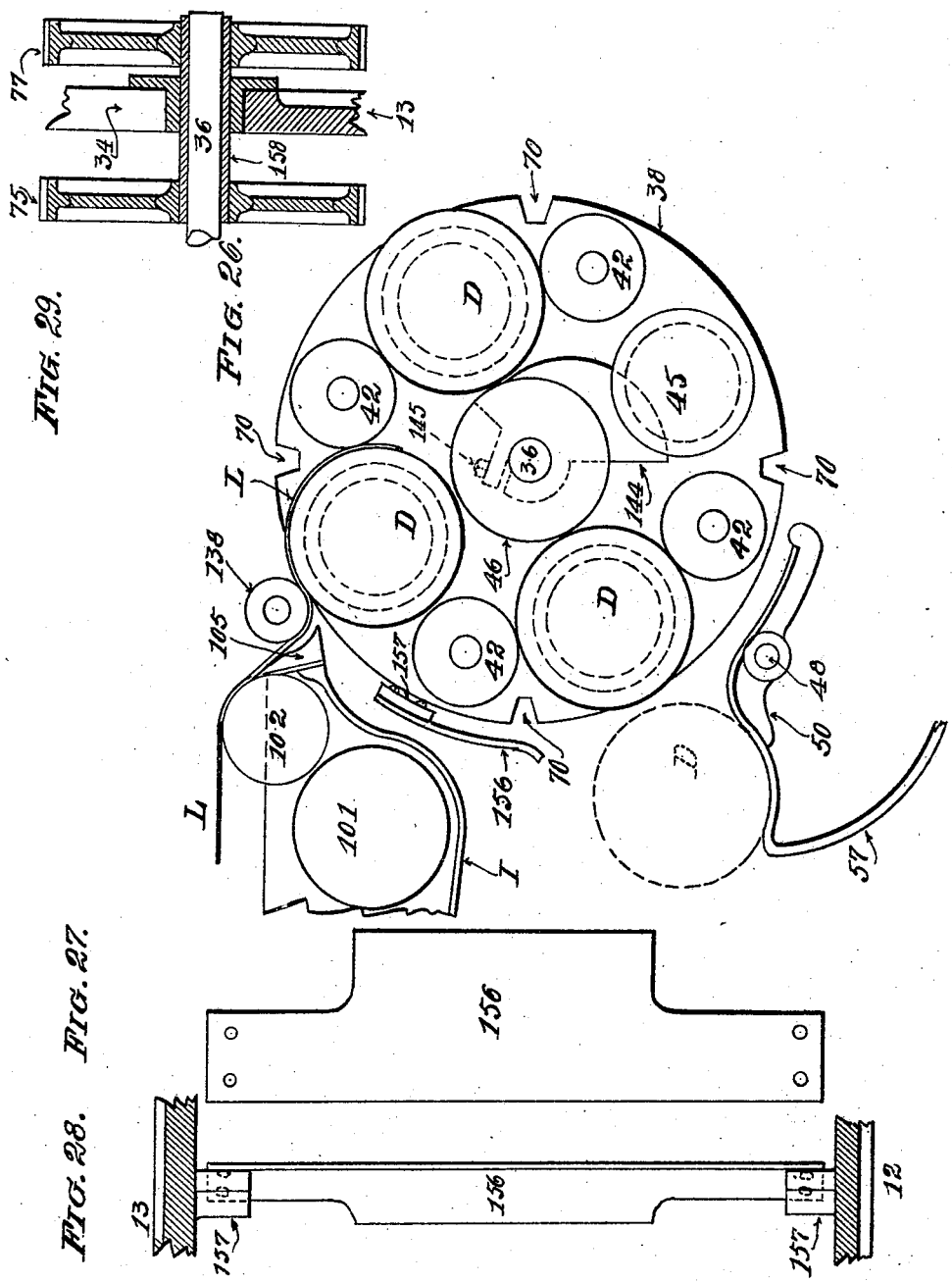

UNITED STATES PATENT OFFICE.

AXEL SCHOLIN, OF CHICAGO, ILLINOIS, ASSIGNOR TO AUTOMATIC WRAPPING MACHINE CO.

LABEL-PASTING MACHINE.

1,417,634. Specification of Letters Patent. Patented May 30, 1922.

Application filed August 11, 1916, Serial No. 114,394. Renewed November 28, 1919. Serial No. 341,268.

*To all whom it may concern:*

Be it known that I, AXEL SCHOLIN, a citizen of the United States, and a resident of the city of Chicago, in the county of Cook and State of Illinois, have invented a certain new and useful Improvement in a Label-Pasting Machine; and I do hereby declare that the following description of my said invention, taken in connection with the accompanying sheet of drawing, forms a full, clear, and exact specification, which will enable others skilled in the art to which it appertains to make and use the same.

My invention relates generally to improvements in a label pasting machine and it consists, essentially, in the novel and peculiar combination of parts and details of construction, as hereinafter first fully set forth and described and then pointed out in the claims.

The object of this invention is the production of an automatically operating machine for rapidly and effectively pasting labels on, preferably round, cans and similar containers, such as fruit and vegetable cans, rolled oats and similar cereals, meats, etc.

To accomplish this object I construct this machine in the preferred embodiment of my invention, as illustrated in the drawings already referred to, in which Figure 1 is a side elevation of the left side of the machine. Figure 2 is a side elevation of the same showing the right hand side thereof, the delivery and the discharging chutes being partly broken away in these and other figures. Figure 3 is a front end view of the machine, being that end of the machine at which the cans are delivered thereto, and Figure 4 is a rear end elevation thereof. Figure 5 is a longitudinal sectional elevation on line 5—5 of Fig. 4. Figure 6 is a side elevation of the paste container detached. Figure 7 is a plan of the same. Figure 8 is a transverse sectional elevation of the same on line 8—8 of Figs. 6 and 7. Figure 9 is a fragmental sectional view on line 9—9 of Fig. 7. Figure 10 is a fragmental view of the mechanism by which the cylinder is rotated by a step-by-step movement. Figure 11 is an end elevation of the same. Figure 12 is a fragmental view of the mechanism by which the labels are guided in the label container, showing the normal position of the parts illustrated. Figure 12<sup>a</sup> is a similar view of the same parts showing the label box in its terminal forward position. Figure 13 is a plan of the reciprocating frame into which the label container is removably placed. Figure 14 is a side elevation of the same. Figure 15 is a plan view of the label container, and Figure 16 is a longitudinal sectional elevation on line 16—16 of Fig. 15. Figure 17 is a transverse sectional elevation on line 17—17 of Fig. 15. Figure 18 is a fragmental front elevation of the machine showing the location of the reciprocating frame and part of the mechanism by which the frame is reciprocated. Figure 19 is a sectional detail view of the clutch mechanism employed in this machine. Figure 20 is a plan view of the driving means and its clutch by which connection with the driven gear wheel is established. Figure 21 is a plan view of a portion of the driving means. Figure 22 is a diagrammatic detail of the clutch-throwing mechanism; and Figure 23 is a sectional plan thereof. Figure 24 is a quasi-diagrammatic view of the mechanism which lifts the can or container into the cylinder. Figure 25 is a plan of the gearing by which the cans are rotated in the cylinder. Figure 26 is a diagrammatic elevation of the cylinder and parts connected therewith disclosing details of construction. Figure 27 is a view of the guard in front of the cylinder; and Figure 28 is a plan of the same, fragments of the two housings being shown in section. Figure 29 is a sectional elevation of the two spur gear wheels and their mounting in one of the housings, by which gear wheels the can-rotating mechanism is operated.

Generally speaking this machine includes the following instrumentalities:—

A chute by which the cans are delivered to the machine; a cylinder in which the cans are rotated while the label is wrapped around the container; a lifting device which takes the containers, one at a time, and delivers them to the cylinder; a movable paste box containing the necessary paste; pasting rolls in said paste box which deliver the paste to the underside of the label; a label box or container within which a pack of labels is stored and from which the labels, one at a time, are being automatically removed; means for preventing more than one label being withdrawn at a time; automatic mechanism for intermittently or by a step-by-step movement to rotate the cylinder, and clutch mechanism whereby the machine may be started and stopped when desired or when no cans are being delivered to the machine. These and other mechanisms, which will hereafter fully appear, are all contained within a substantial and compact housing, the entire machine being so constructed that it and several of these machines can be attended to by one operator whose only duty it is to see that the containers are regularly delivered at the machine, and that the paste container is always fully supplied with paste and the labels replenished in the label box.

This machine includes a bed plate A of substantially rectangular contour. This bed plate is mounted, if desired, on legs B, Figs. 1 and 4, and it carries two upstanding housings 12, 13 medially of which there is located a transverse main driving shaft 14. This main driving shaft is rotated from any prime mover, not shown, by means such as a driving pulley 15, or other suitable mechanism, and this pulley 15 is connected by certain clutch mechanism to a main driving gear wheel 16 in the following manner:—

In the face of the hub 17 of the driving pulley 15 there are a series of depressions 18, Figs. 19 and 21, having perpendicular walls 19. In order to render these walls wear-resisting, I plug holes in the hub 17 with hardened steel plugs which for some distance from their outer ends are cut away, as indicated in Fig. 21, to produce these vertical walls 19. In the hub 20 of the main driven gear wheel 16 there is a longitudinal bore in which is located a clutch bolt 21, Figs. 19 and 20, which clutch bolt is also longitudinally bored at 22 to receive a coil spring 23 bearing at one end against a stop pin 24, and at its opposite end against the bottom of the bore 22. The tendency of this clutch bolt 21 is to project beyond the face of the main driven gear wheel 16 into one or the other of the series of depressions 18, unless withdrawn therefrom by the following mechanism:—

In the housings 12, 13 there is a further transverse shaft 25, which shaft 25 carries at its outer extremity a trip lever 26, Figs. 22 and 23, which trip lever has at one side of its center a handle 27 and at the opposing side an arcuate member 28, which is sharply pointed at its extremity 31 and which has a shoulder or offset 29. The arcuate portion of this trip lever 26 bears normally on the periphery of the hub 20 of the gear wheel 16; but on this hub 20 there is located, and partly embracing the hub 21, a cam 30 which is constructed to lift the arcuate portion 28 of the trip lever.

The operation of this device is as follows: As long as the arcuate member 28 rides on the cam 30 the main driving pulley and the main driven gear wheel 16 remain coupled together by the clutch bolt 21 engaging one of the depressions 18, but when this arcuate member drops from the end of the cam 30 upon the periphery of the hub 20 the wedge shaped end 31 of the trip lever passes behind the nose 32 of the clutch bolt, and this nose moving upon the tapering portion 31 of the trip lever pulls the clutch bolt 21 out of the recess 18 and thereby disconnects the two members 15 and 16. It will thus be observed that the main driven gear wheel 16 is permitted to stop with every revolution of the main driving pulley 15; but if the handle 27 on the trip lever 26 be held depressed the arcuate member 28 remains without the range of the nose 32 on the clutch pin and therefore the two members 15, 16 remain coupled as long as the handle 27 is held depressed.

In this connection I will state that the shaft 25 to which the trip lever 26 is connected performs a further function to which reference will now be had.

At the forward end of the machine there is located an inclined delivery chute C of a width corresponding to the length of the container or can D, around the periphery of which the label is to be pasted. This container D when it reaches the lower end of the chute C, as shown in Fig. 5, lifts an arm 33 secured medially between the housings 12, 13, upon the aforesaid shaft 25 and thereby rotates the latter shaft, and with it lifts the trip lever 26 and thus causes the clutch bolt 21 to engage one of the recesses 18 and to connect the members 15, 16 for the term of one revolution of the pulley 15. And it will be noted that as long as there are cans or containers D in the delivery chute C and the machine is operating, this arm 33 will remain in elevated position; but as soon as the supply of cans ceases, this arm 33 will drop and thereby disconnect the members 15, 16, and the machine will thus be automatically stopped until a new supply of cans is furnished.

I shall now describe the intermittently operating cylinder E, Fig. 1, and others, and its relation to the chute C.

Near the rear ends of the housings 12, 13, and in slotted openings 34 therein, in which openings there are located bearings 35, there is fixedly mounted in said bearings a transverse or cylinder shaft 36 held to one of said bearings by a set screw 159, Figs. 2 and 4, on which there are rotatably mounted in spaced relationship two annular disks or cylinder heads 37, 38, which disks are connected by a series of preferably four shafts 39, 39.1, 39.2, and 39.3, which shafts rotate in bearings 40, 41, in said heads 37, 38, and upon each of these four shafts there are mounted flexible rollers 42, 42.1, 42.2, and 42.3. Medially between these shafts there are located in the annular disk or head 37, four clamping plates 43, 43.1, 43.2, 43.3 Fig. 11, which plates are mounted on spring-pressed shafts 44, retained in extended position by locking nuts 44$^a$. On the face of the opposing disk 38, and coinciding in axial alignment with the plates 43, there are fixed plates 45; and between these latter plates and the spring pressed plates 43, the containers D are caused to rotate in conjunction with a flexible roll 46, rotatively mounted in the cylinder shaft 36 between the annular disks 37, 38.

When a container D reaches the lower end of the delivery chute C it has to be lifted into position in the cylinder E between the plates 43 and 45; and the means by which this lifting is accomplished and which also prevents succeeding containers from following the first container until the proper moment has arrived, comprises the following elements:

By references to Figs. 2 and 24, it will be noted that on the main driving shaft 14, on the inside of, and adjacent to, the housing 12, there is located a cam 47; and on a transverse shaft 48 journalled in bearings 49, Fig. 2, there is a curved member 50 formed to fit the peripheral curvature of container D, said curved member being provided with a crank pin 51 connecting with the terminal 58 of the Z-lever 52, by a connecting rod 53. This lever 52 is pivoted on a stud bolt 54, projecting from the inner face of the housing 12; and it carries at one of its angles 55 a roller 56, which rolls on the periphery of the cam 47. The curved portion of the member 50 terminates in a downwardly extending curved apron 57, which has its center in the center of the shaft 48, and which when oscillated, passes upwardly close to the terminal of the chute C, and thereby prevents the next succeeding can or container D from passing into the machine until the apron 57 is again depressed to normal position.

The rotation of the cam 47 causes the Z-lever 52 to be lifted and thereby the curved element 50 to be rotated and with it the container D in a curved path, as shown by the curved line 59 in Fig. 24, having its center of rotation or oscillation in the center of the oscillating shaft 48, the terminal of said oscillatory movement placing the can or container D exactly in the required position between the proper plates 43 and 45 in the cylinder E.

When the container D has been placed in proper position in the cylinder E, shown in Fig. 26, the said cylinder is caused to rotate one-fourth of a revolution, to permit a second can or container to be lifted into the cylinder and to place the first can into proper position to be supplied with its label. Various means may be employed to accomplish this object, a very suitable mechanism being illustrated in detail in Figs. 10 and 11, and which comprises a stud shaft 61, located on the inner side of the housing 12. On this stud shaft there is placed a downwardly extending arm 62; and on the cylinder shaft 36 there is mounted a ratchet wheel 63 having four engaging notches 63$^a$, and on said shaft 36 there is an oscillating arm 64 provided with a spring-depressed pivoted dog or click 65, the arm 62 being connected to the ratchet arm 64 by a connecting rod 66. The arm 62 is oscillated by the following means: On the outer side of the housing 12 and secured to the main driving shaft 14, there is a cam 67, and on the stud shaft 61 there is located a downwardly pending arm 68 carrying at its end a roller 69 which engages the periphery of the cam 67 in such manner that the rotation of the main shaft 14 causes the oscillation of the arm 68 and through it and the arm 62 the operation of the ratchet mechanism heretofore described. This cam 67 operates the arm 62 in one direction only and to force its return to normal position, a tensioned coil spring 61$^a$, Figs. 3 and 10, wound around the stud 61 and having one end connected to the arm 62, and its other end fastened to the housing 12 is introduced for this object. And I may now state that the cylinder which is intermittently rotated by said ratchet mechanism makes one complete revolution to four revolutions of the main shaft 14.

In order to positively lock the cylinder E against rotation until liberated, I resort to means comprising the following instrumentalities:

In the periphery of the cylinder disk or head 38 there are four equally spaced notches 70, Figs. 5 and 10 and others; and on the main driving shaft 14, Fig. 5, there is located a cam 71. On the shaft 48 which carries the curved member 50, there is loosely mounted an L-shaped arm 72 which carries at its extremity a roller 73 which engages the periphery of the cam 71. Opposite this roller 73 the arm 72 has a nose 74 which engages the notches 70 in the cylinder disk 38 and thereby locks the cylinder against rotation. And it may now be noted that the movements of the intermittent rotation of the cylinder E and its locking mechanism are so timed that as soon as the nose 74 recedes from the disk 38 the ratchet mechanism initiates the step movement of said cylinder, and that when this latter movement is completed, the lever 72 with its nose 74 has completed its return movement and again assumed its normal position shown in Fig. 5. The arm 72 is moved by the cam 71 in one direction only; and a tensioned coil spring 72ª wound around the shaft 48, as shown in Fig. 1, and hitched at one end to said arm 72 and at its other end to the housing 13 is introduced to return said arm 72 after having been moved by the cam 71, to its normal position.

The cans or containers D are rotated in the cylinder E by contacting with the rollers 42, 42.1, 42.2, and 42.3; and these rollers are rotated with their shafts 39, 39.1, 39.2, and 39.3 by means of planetary gearing shown in detail in Fig. 25, and comprising a spur gear wheel 75 and four gear pinions 76 secured to the said roller shafts on the outer face of the cylinder disk 38. The spur gear wheel 75 is rotated by a train of gearing from the main driving shaft 14 including, as shown in Figs. 1 and 29, the main spur gear wheel 16 already referred to. This spur gear wheel 16 engages a slightly smaller gear wheel 77 secured to a sleeve 158, together with the spur gear wheel 75 at the outer end of the cylinder shaft 36, the direction of rotation of this gear wheel 77 and the gear wheel 75 of the planetary gearing being indicated by arrows in Fig. 25.

Referring now to Figs. 3, 4 and 18, there are in the inner faces of the housings 12, 13 at the upper ends thereof grooves 78 and in these grooves is movably located a frame G, detailed in Figs. 13, 14 and 18, which frame is rectangular in contour and includes a front cross bar 79, a rear cross bar 80 and two side bars 81, 82. This frame G carries a label container H, shown in detail in Figs. 15, 16, and 17, it being a rectangular, box-shaped, structure, the bottom 83 of which is of less length than the said container or box H to afford an opening 84 therein, the object of which will be hereinafter explained. This label box H is removably retained in the frame G by having at its ends bars 85, 86 of which the bar 85 is constructed to engage notches 87, Fig. 13, and the bar 86 to engage notches 88 on the bars 79 and 80 respectively.

The rectangular frame G is reciprocated by mechanism including the following elements:

On the outside of the housing 12 and in front of the cam 67 already referred to there is located a crank disk 89, Figs. 2 and 4, and on a transverse shaft 90 located in bearings 91 near the front end of the machine, there is secured an upstanding arm 92 which connects with the wrist pin 93 of the crank disk 89 by a connecting rod 94. Between the two housings 12 and 13, and adjacent the inner walls thereof, there are affixed to said shaft 90 two upstanding arms 95; and on the rectangular frame G there are two downwardly extending lugs 96 which connect the frame G to the upstanding arms 95 by connecting links 97. The rotation of the main shaft 14 causes the reciprocation of the frame G with its label box H in an obvious manner.

Located below the reciprocating frame G there is removably located a paste receptacle I shown in detail in Figs. 6, 7, 8 and 9. This paste receptacle is placed on two opposite facing ledges or runways 98, Figs. 3 and 5, and it comprises a substantially rectangular box having an inclined bottom 99, and at its sides oppositely extending ledges 100, by which the paste box is sustained on the ways 98. The bottom 99 inclines toward the forward end of the paste box, and at this end there is mounted in the said paste box a pick up roller 101, and above this latter roller, a transfer roller 102. The roller 101 is constructed to rotate in the paste contained in the paste box and the roller 102, which is in touch with the roller 101, picks up paste from said roller 101 and applies it to the labels in a manner hereinafter referred to. This latter roller 102 is circumferentially grooved, as indicated at 103, and in front of this roller 102 there is secured a transversely located slightly inclined plate 104 on which there are a series of fingers 105 which extend into the grooves 103 and also project forwardly of the said plate 104. In front of the roller 102 and traversing the paste box I on the top edge thereof there is an adjustable plate 105ª movable secured to the side walls of the paste box by screws 106. This plate 105ª has projections 107, Figs. 6, 7, and 8 which enter the grooves 103 in the roller 102 and scrape any paste that may enter these grooves out of the same. Upon the plate 105ª there are located two angle bars 108, in parallel spaced relation, in the vertical members of which there are journalled, preferably two, shafts 109, having flanges 110, all as clearly shown in Figs. 6 to 9 inclusive.

To the shaft 111 of the roller 101 there is secured a gear wheel 112; and to the shaft 113, Figs. 7 and 9, of the roller 102, there is secured a gear wheel 114, while a further, intermediate or idler, gear wheel 115 connects the two gear wheels 112 and 114, as best shown in Fig. 9. These paste rollers 101 and 102 are rotated by mechanism including the following elements.

On the roller 102 there is an outwardly extending hub 116 which has an angular bore 117 into which enters an angular rod 118, Figs. 1, 3, and 4; and meshing with the main driving gear wheel 16 there is a pinion 119, journalled in the housing 13, which pinion has axially a square bore 120 through which said angular rod 118 passes and enters the square hole 117 in the hub of roller 102, and the main gear being rotated, the paste rollers are rotated accordingly. This square rod 118 may be withdrawn from the square opening 117 in the hub 116, thereby permitting the paste box I being withdrawn from the machine for the purpose of cleaning the paste box and its contained mechanism whenever necessary, and especially when the machine is for some time put out of operation.

In order to prevent more than one label being withdrawn from the label box at a time, I provide mechanism for raising the front ends of all the labels contained in said box except the lowermost one which is to be applied to a can, and this mechanism shown in detail in Figs. 12 and 12ª includes the following elements:—

On the main shaft 14 and close to the inner side of the housing 13, there is located a cam 124, behind the cam 71, shown in Fig. 5, and upon a stud bolt 125, projecting from the inner face of the said housing 13, there is pivoted an arm 126, on which there is mounted a roller 127. Traversing the housings 12, 13 there is journalled, in bearings 128, Fig. 2, a rocking shaft 129, and on this shaft there is mounted a bell crank lever 130, the short arm of which connects with the arm 126 by a link 131, while the long arm thereof is pivotally connected to a transverse plate 132 at one end of said plate. There is on said rocking shaft 129, opposite the bell crank 130, an arm 130ª, Fig. 4, which is a mate to the said long arm, and supports the other end of said plate 132. At the ends of this plate there are bars 133, which bars slide upon rollers 134. On the upper surface of the plate 132 there are a series of curved bars 134, which bars 134 pass through slots 135 in the forward wall 136 of the label box H when said label box is reciprocated together with the plate 132. The timing of these two reciprocating movements is as follows:—

When the machine parts as a whole are in normal positions and the clutch is thrown to connect the main shaft 14 to the driving means 15, the wrist pin 93, Fig. 2, stands above a horizontal line through the shaft 14. It follows that when said main shaft 14 is rotated, the label box H in the frame structure G makes a short retrograde movement before it starts on its forward motion, while the cam 124, rotating in the direction of an arrow shown in Fig. 12, causes the arm 126 to drop slightly before it reaches its lowermost position and thereby moves the plate 132 slightly rearwardly before it starts simultaneously with the label box. This forward movement of the plate causes the same to drop slightly at its connection with the bell crank 130 and the co-acting arm 130ª, as shown in dotted lines in Fig. 12. The rearward movement of the label box begins somewhat earlier than that of the plate 132 so that when the two moving elements come to rest, the plate is again forward of the label box, as shown in Fig. 12.

Again referring to Fig. 12, wherein the paste applying roller 102 and the label box H are shown in section in their normal relative positions prior to the slight retrograde movement thereof, it will be noticed that the curved bars 134 on the top of the plate 132 project slightly into the label box and that when the box is supplied with its component of labels L, their forward ends are resting upon the curved bars 134, free from the pasting roller 102. Assuming that the label box H and the plate 132 now commence their initial retrograde movement, the box will move slightly faster or over a greater distance than the plate, so that at the terminal of the initial retrograde movements, the two moving elements have attained the positions shown in Fig. 5. The lowermost label just touches the pasting roller 102 and the weight of the superimposed labels will cause this lowermost label to adhere to the rotating paste roller and to be pulled along and partly around said pasting roller. At the same time the label box and the plate move in unison forward, thereby assisting the lowermost label in moving with the periphery of the pasting roller by being pushed along by the label box until near the completion of the forward movement of the label box the plate comes to rest, but the label box continuing its forward movement, moves over the plate, so that the curved members or bars 134 again project into the label box and for nearly their entire length, the positions of the co-operating parts at this moment being illustrated in Fig. 12ª.

The label box now begins its return movement while the plate remains in its forward position until the end 136 of the label box reaches the position shown in Fig. 12, when both, the label box and the plate, continue to again move in unison until they again reach their normal positions. As already stated, where face cams are employed to cause movement in one direction, the return of such movement is effected by tensioned coil springs and thus are the plate 132 and its operating levers returned to normal position by such a tensioned coil spring, as shown at 129ª in Fig. 4.

Near the upper, rearward margins of the housings 12, 13, there is a transverse shaft 137, on which there is fixed a grooved roller 138, Figs 4 and 5. This shaft with its roller is rotated, as shown in Fig. 1, by a gear pinion 139, meshing with an intermediate gear pinion 140, which, in turn, is engaging the main spur gear wheel 16. This roller 138 performs the function of initially forcing the pasted end of the label to engage, and adhere to, the upper can or container D shown in Figs. 5 and 26. Thus, when the lowermost label adheres with its forward end to the paste supplying roller 102, its end will reach and pass over the fingers 105 on the transverse plate 104 of the paste box, then underneath the roller 138, and the can D rotating, will pull the entire label out of the box H over the pasting roller 102 to be tightly pressed against the can by the rotating rollers 42. During the time that the label box and the plate 132 have performed their functions, the cylinder E has remained at rest; but as soon as these two elements reach their normal positions, the locking lever heretofore described has released the cylinder; and the ratchet mechanism will cause the cylinder E to perform one fourth of a revolution, as already described, and this cycle of movements and operations will continue as long as cans are fed to the machine by the inclined chute C. When the cans D in the cylinder have received their final brushing by a brush 141, shown in Figs. 1 and 5, and have passed below a horizontal center line, they will drop, one after the other into a discharging chute J, from whence they may be removed in any desired manner.

The roller 138 on the shaft 137 comprises a series of, preferably two, sections; and between adjacent sections and at the ends of the rollers 137, there are loosely mounted on the roller shaft 137, curved arms 142, all of which are secured to a transverse plate 143, Figs. 4 and 5. These curved arms bear upon the periphery of the uppermost can D and hold the end of the label while it is being wound around this can until the can has made at least one complete revolution; and in this connection I will state that the cans make four complete revolutions while in the cylinder before they drop out of the same by gravity, thus insuring complete and perfect pasting of the label to the can.

When the first can D has been lifted into the cylinder E and the latter makes its first step movement to elevate the can into the upper position shown especially in Fig. 26, and when the can is being rotated by the rollers 44, these rollers have a slight tendency to push the can out of position, said can being but slightly clamped between the fixed plate 45 and the spring pressed plate 43. To avoid this objection I locate in front of the cylinder a guard plate 156, shown in detail in Figs. 26, 27 and 28. This guard plate 156 extends between the housings 12, 13, which housings have inwardly extending lugs 157, Figs. 4 and 28, to which said guard plate 156 is bolted in any desired manner. Thus, when the can D moves upwardly, it passes in front of the guard plate 156 and thereby is positively retained in proper position. After the can D has reached its upper position, its own weight will keep it between the plates 45 and 43 until it passes downwardly beyond the forward horizontal position, when it will drop out of the cylinder into the discharge chute J, as already explained.

The movement of the label from the label box to the can, when the latter is in upper position, is shown in Fig. 26. Thus the label, printed side uppermost, passes from the label box over the paste applying roller 102 where it receives the paste from the latter roller on its under side, and sticks to this roller until released therefrom by the curved fingers 105 which direct the label under the roller 138, printed side against this roller, and the pasted side against the can. This roller as well as all the other rollers 42 and 46 are grooved in their peripheries so as to admit air between the label and the roller 138 and between the can and the rollers 42 and 46 to prevent adherence to these rollers, which is desirable to the proper functioning of the machine.

I have already stated that the cans D drop out of the cylinder by gravity after the can has passed the horizontal center line of the cylinder. But to insure a positive discharge of the cans, especially when filled with rather light substances, such as rolled oats, etc., I secure to the cylinder shaft 36, which as heretofore described is stationary, adjacent to the cylinder heads or disks 12, 13, cams 144, shown in Figs. 4 and 26, by suitable means such as set screws 145, the peripheries of which cams project into the curved path of the descending cans, as shown in Fig. 26. When these cans are on the descent they will ride on the periphery of said cams 144, and thereby be forced outwardly from between the plates 43 and 45 in an obvious manner.

In order to regulate the amount of paste that is to be applied to the labels I provide means for accomplishing this object, which means include two rods 150, best seen in Figs. 6 and 7. These rods are guided between lugs 153 extending upwardly from the rear wall 154 of the paste box I and they extend back to the plate 105ª where they are formed into hooks 151, which engage the said plate 105ª. The free ends of these rods 150 are screw threaded and engage thumb nuts 152. By rotating these thumb nuts the plate 105ª may be moved toward the paste applying roller 102 and away therefrom, thus regulating the film of paste that may adhere to said roller 102. I prefer this adjustment for the reason that it enables the paste film being regulated to a nicety and thereby prevents wasting of paste or not applying sufficient paste to the labels.

Since I have heretofore described the operation of each of the various elements and sub-combination of parts which perform specific functions, I do not deem it necessary to again enter into a description of the operation of the machine, except to state that I prefer to rotate the main shaft at an approximate speed of sixty revolutions per minute. This results in the cylinder E making twenty revolutions per minute due to the difference in ratio of the gear wheels 16 and 77; but since every one fourth of a revolution of this cylinder puts a label on to a can, it follows that the capacity of this machine is approximately eighty cans per minute; so that it will be seen that this machine has an enormous capacity; and, since an operator of the machine has practically nothing to do but see to it that labels and paste are replenished whenever necessary, such operator can easily attend to a number of these label-pasting machines.

I have heretofore described the preferred embodiment of my invention, but I desire it to be understood that many of the details of construction herein disclosed may be varied by persons skilled in the art to which my invention appertains, without departing from the scope of the subjoined claims.

Having thus fully described my invention, I claim as new, and desire to secure to myself by Letters Patent of the United States:—

1. In a label pasting machine, the combination, of an intermittently rotating cylinder, a series of rollers rotatably mounted in said cylinder, a frame structure reciprocatingly mounted in said machine, a label box, removably mounted in said frame structure, a paste box, said paste box being located underneath said label box, said paste box being removable independently of said label box, paste supplying rollers rotatably mounted in said paste box, mechanism constructed to intermittently rotate said cylinder, automatically operating means constructed to positively lock said cylinder against rotation during the periods of non rotation thereof, automatically operating means for releasing the cylinder locking means, means for continuously rotating said rollers in said cylinder, and means for rotating the paste rollers in said paste box.

2. In a label pasting machine, the combination, of an intermittently rotatable cylinder, a series of rollers rotatably mounted in said cylinder, a reciprocating label container, a paste container, paste transferring rollers, rotatably mounted in said paste container, means constructed to lock the said cylinder against rotation between the periods of rotation of said cylinder, means for imparting said intermittent rotation to said cylinder, and means for rotating said rollers in said cylinder and the rollers in said paste container.

3. In a label pasting machine, the combination, of an intermittently rotatable cylinder, mechanism constructed to lift cans into said cylinder, a series of rollers rotatably mounted in said cylinder, said rollers being constructed to rotate said cans when placed into said cylinder, a reciprocating label container mounted above and in front of said cylinder, a paste container, paste supplying rollers rotatably mounted in said paste container below said label container, and mechanism constructed to impart said intermittently rotating movement to said cylinder, and mechanism constructed to rotate said rollers in said cylinder and the paste supplying rollers in said paste container.

4. In a label pasting machine, the combination, of an intermittently rotatable cylinder, means constructed to lock said cylinder against rotation during the intervals between the periods of rotation, automatically operating mechanism for releasing the cylinder locking means, a series of rollers rotatably mounted in said cylinder, a reciprocating label container mounted above and in front of said cylinder, said label container moving over a distance approximately equal to the length of a label in said container, a paste container located below said label container, said paste container being removably mounted independently of the label container, paste applying rollers rotatably mounted in said paste container, mechanism to impart rotative intermittent movement to said cylinder, means for continuously rotating said rollers in said cylinder, and means for continuously rotating said paste supplying rollers.

5. In a label pasting machine, the combination, of an intermittently rotatable cylinder, means constructed to lock said cylinder against rotation during the intervals between the periods of rotation, automatically operating mechanism for releasing said cylinder locking mechanism, a series of rollers rotatably mounted in said cylinder, a reciprocating label container mounted above and in front of said cylinder, a paste container located below said label container, paste applying rollers rotatably mounted in said paste container, mechanism constructed to impart said intermittent rotation to said cylinder, means constructed to continuously rotate said rollers in said cylinder, means for rotating said paste applying rollers, and automatically operating means constructed to stop the operation of the machine when the supply of cans to the machine ceases, the latter means including a main shaft, a driving element loosely mounted on said main shaft, a main driving gear wheel fixed to said main shaft, clutch mechanism connecting said main driving gear wheel to said driving element, and means operated by containers as they are being delivered to said cylinder, to keep said main driving wheel connected to said driving element.

6. In a label pasting machine, the combination, of a rotating cylinder constructed to receive a multiplicity of containers, said rotation of said cylinder being an intermittent one, and means for applying a label to one of said containers while the cylinder is at rest, said means including a horizontally reciprocating label container, a paste box, paste applying rollers rotatably mounted in said paste box, said label container having a longitudinal movement approximately equal to the length of a label, said longitudinal movement of said label box being slightly slower than the peripheral movement of said container to hold said label under a slight restraint or tension while being wound around said container.

7. In a label pasting machine, the combination, of an intermittently rotatable cylinder, a chute, means for lifting a can from said chute into said cylinder between each interval of rotation of said cylinder, there being on said lifting means an element constructed to separate a can which is being lifted from other cans in said chute and preventing other cans from reaching the lifting position until said element has returned to normal position, means in said cylinder constructed to support cans in said cylinder, said means including a roller loosely mounted in said cylinder in the axial line of rotation of said cylinder, means for continuously rotating said cans in said cylinder, a reciprocating label container, a paste container, paste applying rollers in said paste container, means to impart intermittent movement to said cylinder, and means for rotating said paste applying rollers.

8. In a label pasting machine, the combination, of an intermittently rotatable cylinder, a series of rollers rotatably mounted in said cylinder, a chute constructed to conduct cans toward said cylinder, means in said cylinder for supporting cans delivered to said cylinder while rotating in said cylinder, including a roller loosely mounted in said cylinder in the axial line of rotation of said cylinder, and means for lifting can units into said cylinder, said latter means being provided with mechanism whereby but one can at a time can be lifted into said cylinder, said means for lifting said can units and for detaining other cans including a main driving shaft, a cam on said shaft, a rocking shaft, a connection between said cam and said rocking shaft, a concave element fixed to said rocking shaft, and a curved apron depending from the extremity of said concave element.

9. In a label pasting machine, the combination, of an intermittently rotating cylinder, a series of rollers rotatably mounted in said cylinder, a chute constructed to conduct cans toward said cylinder, means in said cylinder for supporting cans delivered to said cylinder while rotating in said cylinder, and means for lifting one can at a time to said cylinder and detaining other cans in said chute and preventing them from entering said cylinder.

10. In a label pasting machine, the combination, of an intermittently rotating cylinder, a series of rollers rotatably mounted in said cylinder, a chute constructed to conduct cans toward said cylinder, means in said cylinder for supporting cans delivered to said cylinder while rotating in said cylinder, and means for lifting one can at a time to said cylinder and detaining other cans in said chute and preventing them from entering said cylinder, said latter means including a curved oscillatable member constructed to support a can, said oscillatable member being provided with an apron.

11. In a label pasting machine, the combination, of an intermittently rotating cylinder, a series of rotating rollers mounted in said cylinder, means in said cylinder for supporting cans in said cylinder while rotating, a can supplying chute, and means for lifting said cans from said chute into said cylinder, the latter means including an oscillating shaft, a curved member mounted on said shaft in adjacency to the terminal of said chute, said curved member having a curved apron constructed to prevent other cans from entering the cylinder while one can is being lifted into said cylinder.

12. In a label pasting machine, the combination, of an intermittently rotating cylinder, means for supplying said cylinder with cans, means for rotating said cans in said cylinder, a label container mounted above and in front of said cylinder, a paste-container removably mounted below said label container, paste applying rollers rotatably mounted in said paste container, and means connected with said label container constructed to lift all but the lowermost label in said container free from said paste applying rollers.

13. In a label pasting machine, the combination, of an intermittently rotating cylinder, means for supplying said cylinder with cans, means for rotating said cans in said cylinder, a reciprocating label container mounted above and in front of said cylinder, a paste container removably mounted below said label container, paste applying rollers rotatably mounted in said paste container, said label container having an opening in its bottom at its forward end over said paste applying rollers, and a reciprocating element constructed to enter said label container and to lift all but the lowermost label in said container at their forward ends.

14. In a label pasting machine, the combination, of a pair of housings, an intermittently rotating cylinder mounted in said housings, rollers rotatably mounted in said cylinder, a label container mounted between said housings in front of and above said cylinder, a paste container located below said label container, said label container having a partly open bottom, means for reciprocating said label container, and a reciprocating plate, said plate having a series of upwardly extending bars, said plate being constructed to enter said label container and to lift the forward ends of the labels in the latter container.

15. In a label pasting machine, the combination, with a rotatable cylinder, of rollers rotatably mounted in said cylinder, paste applying means, a reciprocating label container above said paste applying means, said label container having an opening in its bottom at its forward end, a plate, said plate having a series of upwardly extending bars, and means for reciprocating said plate and projecting the same into the said label container, said means including cam-actuated mechanism.

16. In a label pasting machine, the combination, of an intermittently rotating cylinder, a series of rollers rotatably mounted in said cylinder, a paste container, rotatably mounted paste applying rollers in said paste container, a label box, said label box being mounted in front of and above said cylinder, said label box being a rectangular structure approximately the size of the label, the bottom of said label box being partly removed, means for reciprocating said label box, said latter means including a rotating shaft, a crank disk on said shaft, an oscillating shaft, an upstanding arm on said oscillating shaft, a rod connecting said crank disk to said arm, a further upstanding arm on said oscillating shaft, and a rod connecting said latter arm to said label box.

17. In a label pasting machine, the combination, of an intermittently rotating cylinder, a series of rollers rotatably mounted in said cylinder, a paste container, rotatably mounted paste applying rollers in said paste container, a label box, said label box being mounted in front of and above said cylinder, said label box being a rectangular structure approximately the size of the label, the bottom of said label box being partly removed, means for reciprocating said label box, said latter means including a rotating shaft, a crank disk on said shaft, an oscillating shaft, an upstanding arm on said oscillating shaft, a rod connecting said crank disk to said arm, a further upstanding arm on said oscillating shaft, and a rod connecting said latter arm to said label box, the movements of said label box being first a short retrograde movement, then a full forward movement, and finally a partial reverse movement.

18. In a label pasting machine, the combination, with a rotatable cylinder, of rollers rotatably mounted in said cylinder, paste applying means, a reciprocating label container above said paste applying means, said label container having an opening in its bottom at its forward end, a plate, said plate having a series of upwardly extending bars, means for reciprocating said plate and projecting the same into the said label container, said means comprising a rotating shaft, a cam on said shaft, a pivoted arm, a roller on said arm engaging said cam, a bell crank lever, a rod connecting said pivoted arm to said bell crank lever at one arm thereof, the other arm of said bell crank lever being pivotally connected to said plate.

19. In a label pasting machine, the combination, with a rotatable cylinder, of rollers rotatably mounted in said cylinder, paste applying means, a reciprocating label container above said paste applying means, said label container having an opening in its bottom at its forward end, a plate, said plate having a series of upwardly extending bars, means for reciprocating said plate and projecting the same into the said label container, said means comprising a rotating shaft, a cam on said shaft, a pivoted arm, a roller on said arm engaging said cam, a bell crank lever, a rod connecting said pivoted arm to said bell crank lever at one arm thereof, the other arm of said bell crank lever being pivotally connected to said plate, and means for returning said plate to normal position after having been forwardly moved by said cam.

20. In a label pasting machine, the combination, of an intermittently rotating cylinder, a series of rollers rotatably mounted in said cylinder, a label container reciprocatingly mounted in front of and above said cylinder, and a paste container located below said label container, there being mounted in said paste container paste applying rollers, and a pair of rotating shafts in front of said paste applying rollers, said shafts having flanges, there being in the bottom of said label container an opening into which the flanges aforesaid enter to sustain the forward ends of labels retained in said label container.

21. In a label pasting machine, the combination, of a rotating cylinder, a series of rotating rollers in said cylinder, a label container, a paste box, said paste box being a substantially rectangular structure having an inclined bottom, a paste pick-up roller, a paste applying roller in said paste box, a train of gears connecting the latter rollers for rotation, a plate in front of the paste applying roller, shafts rotatably mounted on said plate, and means constructed to move said plate toward said paste applying roller.

22. In a label pasting machine, the combination, of a rotating cylinder, a series of rotating rollers in said cylinder, a label container, a paste box, said paste box being a substantially rectangular structure having an inclined bottom, a paste pick-up roller, a paste applying roller in said paste box, a train of gears connecting the latter rollers for rotation, a plate in front of the paste applying roller, shafts rotatably mounted on said plate, and means constructed to move said plate toward said paste applying roller, the latter means including threaded rods and rotatable buttons.

23. In a label pasting machine, the combination, of a rotating cylinder, a series of rollers rotatably mounted in said cylinder, means for rotating said rollers, mechanism for imparting intermittent rotative movement to said cylinder, the latter means including a main driving shaft, a cam on said driving shaft, a further shaft, a pending arm mounted at the end of the latter shaft and engaging said cam, a second arm mounted on the latter shaft, a third shaft on which said cylinder is mounted, there being on said shaft a ratchet wheel, an arm pending from said shaft adjacent said ratchet wheel, a pawl pivotally mounted on said arm, and a connecting rod connecting the last named arm to the second arm.

24. In a label pasting machine, the combination, of a rotating cylinder, a series of rollers rotatably mounted in said cylinder, mechanism for imparting an intermittent movement to said cylinder, means constructed to lock said cylinder against rotation during the intervals of the rotation of said cylinder, said cylinder having two heads, one of said heads being provided with equally spaced apart notches, a main driving shaft, a cam on said main driving shaft, a second shaft, a curved arm loosely mounted on said second shaft, said arm having a lateral extension, and a roller constructed to engage said cam, and a further lateral extension, said latter extension having a nose constructed to engage the notches in the periphery of said cylinder head, and means constructed to return said curved arm to normal position.

25. In a label pasting machine, the combination, of a rotating cylinder, a series of rollers rotatably mounted in said cylinder, a paste container, paste applying rollers rotatably mounted in said paste container, a label container, there being in front of the paste applying rollers a curved element constructed to separate a label attached to the paste applying means from said paste applying roller, a single rotating roller forwardly of said curved element and adjacent thereto, whereby a label passing over said curved element is directed underneath said last named roller, onto a can rotating in said cylinder, said label being pressed on to said can by said last named roller.

26. In a label pasting machine, the combination, of a rotating cylinder, a series of rollers rotatably mounted in said cylinder, a paste container, paste applying rollers rotatably mounted in said paste container, a label container, there being in front of the paste applying rollers a curved element constructed to separate a label attached to the paste applying means from said paste applying roller, a single rotating roller forwardly of said curved element and adjacent thereto, whereby a label passing over said curved element is directed underneath said last named roller, onto a can rotating in said cylinder, said label being pressed on to said can by said last named roller, and curved fingers in front of said last named roller constructed to hold said label to said can after it has passed beyond said last named roller.

27. In a machine for pasting labels to round cans and containers, the combination, of an intermittently rotatable cylinder, means for supplying said cylinder with round cans, said cylinder comprising a fixed shaft, two heads rotatably mounted on said fixed shaft, a roller movably mounted on said fixed shaft, a series of rotatable rollers, said rollers being mounted on shafts having bearings in said heads, a series of spring pressed plates mounted in one of said heads intermediate of said rollers, a series of fixed plates on the other of said heads, said latter heads being in axial alignment with the said spring pressed plates, means for rotating said cylinder, and means for rotating said series of rollers.

28. In a machine for pasting labels to round cans and containers, the combination, of an intermittently rotatable cylinder, means for supplying said cylinder with round cans, said cylinder comprising a fixed shaft, two heads rotatably mounted on said fixed shaft, a roller movably mounted on said fixed shaft, a series of rotatable rollers, said rollers being mounted on shafts having bearing in said heads, a series of spring pressed plates mounted in one of said heads intermediate of said rollers, a series of fixed plates on the other of said heads, said latter heads being in axial alignment with the said spring pressed plates, a pair of cams adjacent each head constructed to force cans held between said spring pressed plates and said fixed plates out of said cylinder, means for rotating said cylinder, and means for rotating said series of rollers.

29. In a label pasting machine, the combination, of a rotatable cylinder, a series of rollers rotatably mounted in said cylinder, means constructed to intermittently rotate said cylinder, and means constructed to rotate the series of rollers during the intervals of rest in the rotation of said cylinder, said latter means including a main driving shaft, a main spur gear wheel mounted on said main driving shaft, a second spur gear wheel, a fixed shaft, a sleeve rotatably mounted on said fixed shaft, a third spur gear wheel, the said latter two spur gear wheels being fixed to said sleeve, a series of gear pinions mounted on the shafts of said series of rotatable rollers and meshing with the third of said spur gear wheels.

30. In a label pasting machine, the combination, of a rotatable cylinder, a series of rollers rotatably mounted in said cylinder, means constructed to intermittently rotate said cylinder, and means constructed to rotate the series of rollers during the intervals of rest in the rotation of said cylinder, said latter means including a main driving shaft, a main spur gear wheel mounted on said main driving shaft, a second spur gear wheel, a fixed shaft, a sleeve rotatably mounted on said fixed shaft, a third spur gear wheel, the said latter two spur gear wheels being fixed to said sleeve, a series of gear pinions mounted on the shafts of said series of rotatable rollers and meshing with the third of said spur gear wheels, means for intermittently rotating said cylinder including a cam mounted on said main driving shaft, and mechanism including a ratchet wheel and a pawl connected to said cylinder.

31. In a label pasting machine, the combination, of an intermittently rotating cylinder, a series of rollers rotatably mounted in said cylinder, a can delivery chute terminating in front of said cylinder, means for lifting cans in said chute one at a time into said cylinder during the periods of non-rotation of said cylinder, said latter means including a main driving shaft, a cam mounted on said shaft, a Z-shaped arm pivotally mounted in said machine, a roller journalled on said arm and engaging said cam, a rocking shaft, a curved member fixed to said shaft, a crank on said curved member, and a rod connecting said crank to the free terminal of said Z-shaped arm.

32. In a label pasting machine, the combination, of an intermittently rotating cylinder, a series of rollers rotatably mounted in said cylinder, a can delivery chute terminating in front of said cylinder, means for lifting cans in said chute one at a time into said cylinder during the periods of non-rotation of said cylinder, said latter means including a main driving shaft, a cam mounted on said shaft, a Z-shaped arm pivotally mounted in said machine, a roller journalled on said arm and engaging said cam, a rocking shaft, a curved member fixed to said shaft, a crank on said curved member, a rod connecting said crank to the free terminal of said Z-shaped arm, and means for returning said curved member to normal position after having been moved by said arm.

33. In a can labeling machine, the combination, of an intermittently rotatable cylinder, a multiplicity of rollers mounted in said cylinder, constructed to rotate cans placed between adjacent pairs of rollers, a label container, a paste box, paste applying rollers in said paste box, means for rotating said cylinder, said rollers, and said paste applying rollers simultaneously, and means for stopping the entire machine when the supply of cans is exhausted, the latter means including a loosely rotating driving element, a main driving shaft on which said driving element is mounted, a main driving gear wheel fixed to said main driving shaft, gearing connecting the cylinder, the rollers in said cylinder, and the paste rollers to said main gear wheel, clutch mechanism connecting the main gear wheel to said driving element, a rocking shaft, an element on said rocking shaft constructed to actuate said clutch, and a depending element on said rocking shaft and projecting into the path of containers when being delivered to said cylinder and resting in elevated position upon said containers as they are being delivered to said cylinder, whereby when the supply of containers is exhausted, said latter element will descend and disengage said driving gear wheel from said driving element.

In testimony that I claim the foregoing as my invention, I have hereunto set my hand.

AXEL SCHOLIN.